United States Patent [19]

Kumagai

[11] Patent Number: 5,162,983
[45] Date of Patent: Nov. 10, 1992

[54] ACTIVE FILTER DEVICE FOR SUPPRESSING HARMONICS IN A SYSTEM INCLUDING A CAPACITIVE LOAD

[75] Inventor: Takeshi Kumagai, Kobe, Japan

[73] Assignee: Mitsubishi Denki Kabushiki Kaisha, Tokyo, Japan

[21] Appl. No.: 727,602

[22] Filed: Jul. 9, 1991

[30] Foreign Application Priority Data

Jul. 11, 1990 [JP] Japan .................................. 2-186318

[51] Int. Cl.$^5$ .............................................. H02M 1/12
[52] U.S. Cl. ..................................... 363/39; 307/105; 307/520; 307/543; 333/167
[58] Field of Search ............... 363/39; 307/105, 540, 307/542, 543, 520, 521, 491; 333/167, 178, 181; 328/167

[56] References Cited

U.S. PATENT DOCUMENTS

| | | | |
|---|---|---|---|
| 4,692,855 | 9/1987 | Kuroiwa | 363/95 |
| 4,812,669 | 3/1989 | Takeda | 307/105 |
| 5,012,400 | 4/1991 | Yasuda | 363/39 |

OTHER PUBLICATIONS

M. Takeda et al., "Harmonic Current Compensation with Active Filter," IEEE, 1987, pp. 809-815.
Mitsubishi Denki Giho (Mitsubishi Electric Corporation's Technical Journal) vol. 62, No. 6, 1988, pp. 15-20.

*Primary Examiner*—Steven L. Stephan
*Assistant Examiner*—Adolf Berhane
*Attorney, Agent, or Firm*—Leydig, Voit & Mayer

[57] ABSTRACT

An active filter suppresses harmonic current components flowing through a power supply, to which a compensation object load including a harmonic component source and a capacitive load is coupled. The active filter supplies a compensation current Ic in accordance with an output of a subtracter coupled to current transformers for detecting the load current I1 and the capacitive load current If, respectively. Thus, the compensation current Ic supplied from the active filter corresponds to and compensates only for the harmonic current components generated by the harmonic component source. The capacitive load current If is excluded from control operation. Thus, the positive feedback of the system is avoided, and stable control operation can be obtained.

7 Claims, 2 Drawing Sheets

ACTIVE FILTER DEVICE FOR SUPPRESSING HARMONICS IN A SYSTEM INCLUDING A CAPACITIVE LOAD

BACKGROUND OF THE INVENTION

This invention relates to an active filter device for suppressing harmonic current components of a power supply system wherein a compensation object load including harmonic component source and a capacitive load are coupled to a power supply.

FIG. 3 is a circuit diagram showing the organization of an active filter device according to this invention, which is disclosed, for example, in Mitsubishi Denki Giho (Mitsubishi Electric Corporation's Technical Journal) Vol. 62, No. 6, 1988, pp. 15 through 20. Coupled to a power supply 1 is a compensation object load 2, which consists of a harmonic component source 3 such as a cycloconverter and a capacitive load 4 such as a capacitor. A current transformer 5 detects the load current $I_l$ flowing into the compensation object load 2. In response to the detection output of the current transformer 5, an active filter 6 outputs compensation current $I_c$ corresponding to the harmonic current components of the load current $I_l$. Thus, the harmonic current components contained in the source current $I_s$ are suppressed via the compensation current $I_c$ supplied from the active filter 6.

The above conventional active filter device has the following disadvantage.

When the compensation object load 2 consists solely of a harmonic component source 3, which has a high impedance, the compensation current $I_c$ outputted from the active filter 6 flows into the side of power supply 1 having a low impedance, and the harmonic current components in the power supply 1 can thus be suppressed. However, when the compensation object load 2 of the capacitive load 4 becomes lower than that of the power supply 1 with respect to certain orders of the harmonic, and a portion of the compensation current $I_c$ flows to the side of the compensation object load 2. Thus, certain harmonic current components detected by the current transformer 5 increase. As a result, the current transformer 5 and the active filter 6 undergo a positive feedback, and the operation becomes unstable. Worse still, the harmonic current components of the source current $I_s$ may even increase.

SUMMARY OF THE INVENTION

It is therefore an object of this invention to provide an active filter device for a system including a capacitive load, by which a stable control characteristic is obtained and there is no danger of increasing the harmonic current components of the source current.

The above object is accomplished in accordance with the principle of this invention by an active filter device which comprises: a power supply; a compensation object load coupled via a line to said power supply and including a harmonic component source and a capacitive load; load current detector means, such as a current transformer, for detecting an overall load current flowing through said compensation object load; capacitive load current detector means for detecting a capacitive load current flowing through said capacitive load; calculation means, such as a subtracter, coupled to said load current detector means and capacitive load current detector means, for calculating a differential current of said overall load current and said capacitive load current; and active filter means, coupled to said calculation means, for supplying to said line a compensation current corresponding to harmonic current components of said differential current, thereby preventing the harmonic current components generated by said harmonic component source from flowing through said power supply.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

In the drawings, like reference numerals represent like or corresponding parts or portions.

DETAILED DESCRIPTION OF THE PREFERRED EMBODIMENTS

Referring now to the accompanying drawings, the preferred embodiments of this invention are described.

Figure 1:
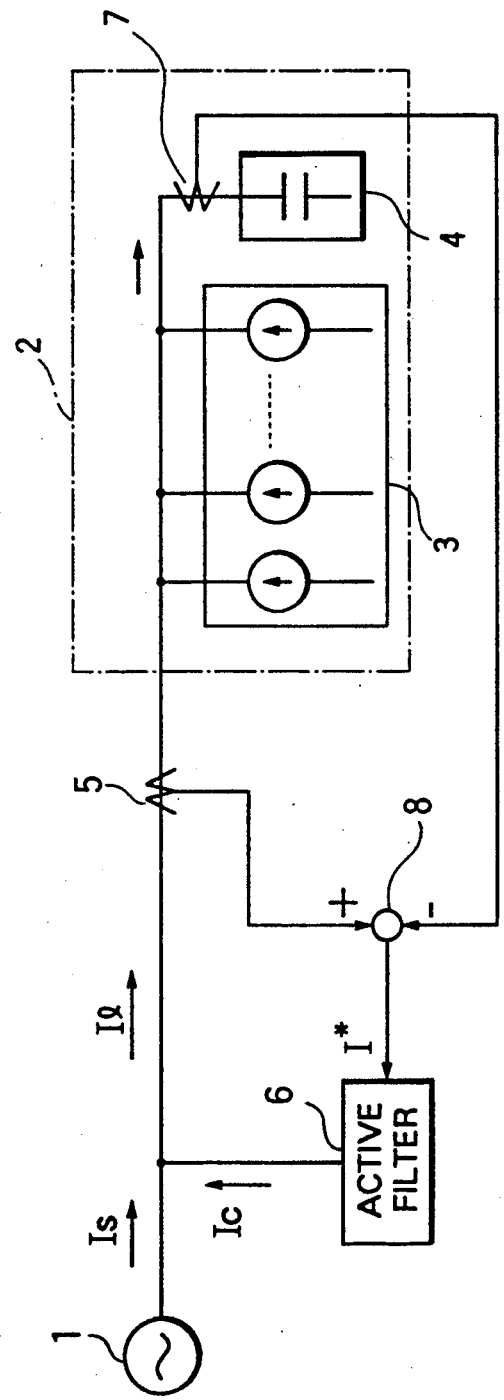
FIG. 1 is a circuit diagram showing the organization of an active filter device according to this invention.
Figure 3:
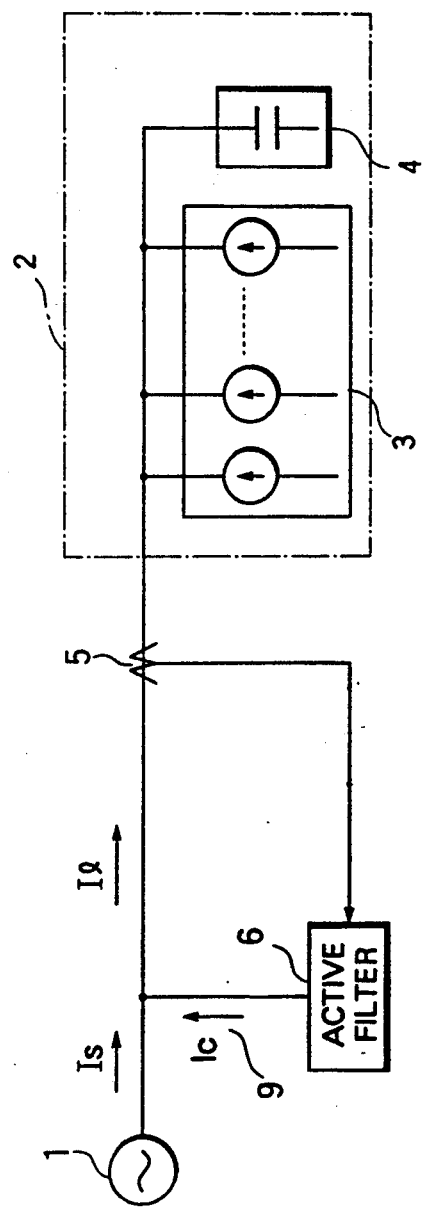
FIG. 3 is a circuit diagram showing the organization of a conventional active filter device.

FIG. 1 is a circuit diagram showing the organization of an active filter device according to this invention. In FIG. 1, the reference numerals 1 through 6 represent parts identical to those of FIG. 3. Thus, coupled to a power supply 1 is a compensation object load 2, which includes a harmonic component source 3 such as a cycloconverter and a capacitive load 4 such as a capacitor. A current transformer 5 detects the load current $I_l$ flowing into the compensation object load 2. Further, another current transformer 7 detects the capacitive load current $I_f$ flowing into the capacitive load 4. A subtractor 8 subtracts the output of the current transformer 7 from the output of the current transformer 5, and the differential current I* outputted from the subtracter 8 is supplied to the active filter 6. The differential current I* is thus expressed as:

$$I^* = I_l - I_f.$$

In accordance with the differential current I*, the active filter 6 supplies the compensation current $I_c$ to the line connecting the compensation object load 2 to the power supply 1. The control target of the compensation current is the harmonic current components of the differential current I*, which correspond to the harmonic current components generated by the harmonic component source 3. Thus, the compensation current $I_c$ outputted from the active filter 6 effectively compensates for the harmonic current components generated by the harmonic component source 3. The harmonic current components contained in the capacitive load current $I_f$ flowing through the capacitive load 4 are excluded from the control operation.

Thus, the system is free from the phenomenon of positive feedback, and exhibits a stable and reliable control characteristic. Since the harmonic current components from the harmonic component source 3 are compensated for by the compensation current $I_c$ from the active filter 6, the harmonic current components of the source current $I_s$ can be effectively suppressed.

Figure 2:
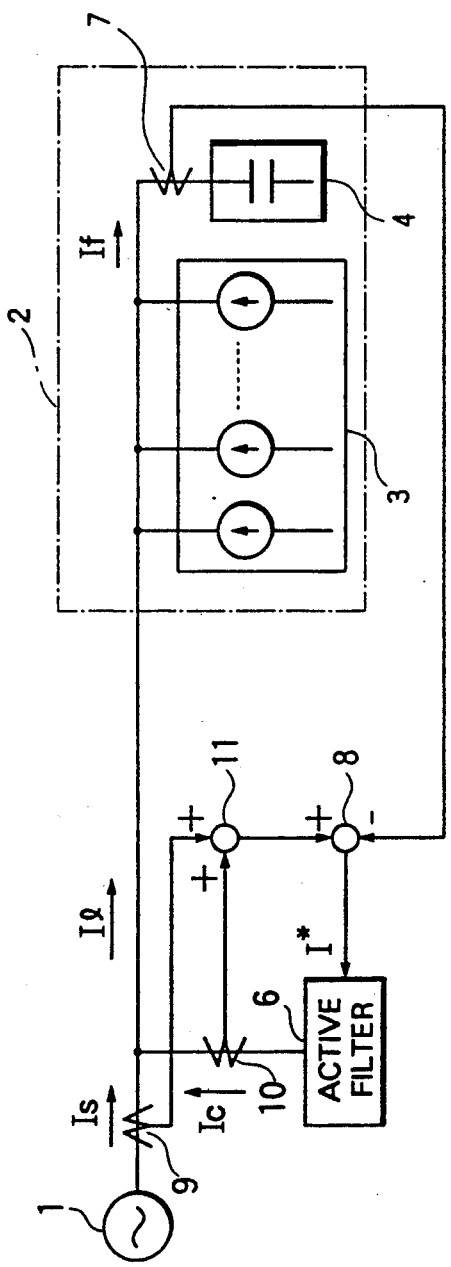
FIG. 2 is a circuit diagram showing the organization of another filter device according to this invention.

FIG. 2 is a circuit diagram showing the organization of another filter device according to this invention. In the case of the active filter device of FIG. 2, a current transformer 9 for detecting the source current $I_s$ and a current transformer 10 for detecting the compensation current $I_c$ are provided instead of a single current transformer 5 of FIG. 1 for detecting the load current $I_l$. The outputs of the current transformers 9 and 10 are supplied to an adder 11. The output of the adder 11, which corresponds to the load current $I_l$, is supplied to the adding side (positive) terminal of subtracter 8. The subtracting (negative) terminal of the subtracter 8 is supplied with the detection output from the current transformer 7. Thus, the differential current I* outputted from the subtracter 8 represents the difference between the load current $I_l$ and the capacitive load current $I_f$. The operation of the active filter device of FIG. 2 is otherwise similar to that of FIG. 1.

What is claimed is:

1. An active filter device for suppressing harmonic current components flowing through a power supply system, comprising:
   a power supply;
   a compensation object load coupled via a line to said power supply and including a harmonic component source and a capacitive load;
   load current detector means for detecting an overall load current flowing through said compensation object load;
   capacitive load current detector means for detecting a capacitive load current flowing through said capacitive load;
   calculation means, coupled to said load current detector means and capacitive load current detector means, for calculating a differential current of said overall load current and said capacitive load current; and
   active filter means, coupled to said calculation means, for supplying to said line a compensation current corresponding to harmonic current components of said differential current, thereby preventing the harmonic current components generated by said harmonic component source from flowing through said power supply.

2. An active filter device as claimed in claim 1, wherein said calculation means comprises a subtracter for calculating a difference between said overall load current and said capacitive load current, thereby obtaining said differential current.

3. An active filter device as claimed in claim 1, wherein said load current detector means comprises a current transformer for detecting the overall load current flowing through said compensation object load.

4. An active filter device as claimed in claim 1, wherein said capacitive load current detector comprises a current transformer for detecting a capacitive load current flowing through said capacitive load.

5. An active filter device as claimed in claim 1, wherein said load current detector means comprises:
   a first current transformer for detecting a source current flowing through said power supply;
   a second current transformer for detecting said compensation current supplied from said active filter means; and
   an adder for calculating a sum of outputs of said first and second current transformers.

6. An active filter device for a power system comprising:
   a power supply;
   a compensation object load coupled via a line to said power supply and including a harmonic component source and a capacitive load;
   load current detector means for detecting an overall load current flowing through said compensation object load;
   capacitive load current detector means for detecting a capacitive load current flowing through said capacitive load;
   calculation means, coupled to said load current detector means and capacitive load current detector means, for calculating a differential current of said overall load current and said capacitive load current; and
   active filter means, coupled to said calculation means, for supplying to said line a compensation current corresponding to harmonic current components of said differential current, and for preventing the harmonic current components generated by said harmonic component source from flowing through said power supply.

7. An active filter device for a power system comprising:
   a AC power supply;
   a compensation object load coupled via a line to said power supply and including a harmonic component source and a capacitive load;
   a first current transformer means for detecting a source current flowing through said power supply;
   a second current transformer means for detecting a compensation current;
   an adder means for calculating a overall load current being a sum of outputs of said first and second current transformers means;
   capacitive load current detector means for detecting a capacitive load current flowing through said capacitive load;
   calculation means, coupled to said adder means and said capacitive load means, for calculating a differential current of said overall load current and said capacitive load current; and
   active filter means, coupled to said calculation means, for supplying to said line the compensation current corresponding to harmonic current components of said differential current, and for preventing the harmonic current components generated by said harmonic component source from flowing through said power supply.

\* \* \* \* \*